Feb. 25, 1941.　　　A. F. SCHIMEK　　　2,233,145
SPRING SUSPENSION
Filed Oct. 12, 1939　　　3 Sheets-Sheet 1

Inventor
ALFRED F. SCHIMEK
by Charles Hill Attys

Feb. 25, 1941.    A. F. SCHIMEK    2,233,145
SPRING SUSPENSION
Filed Oct. 12, 1939    3 Sheets-Sheet 2
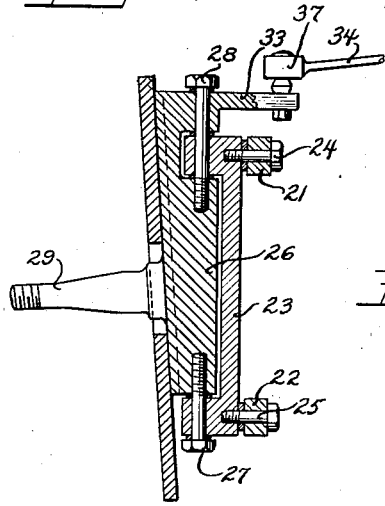
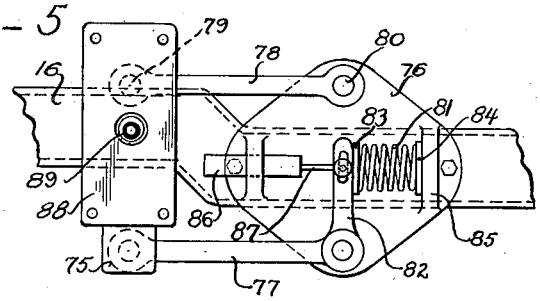
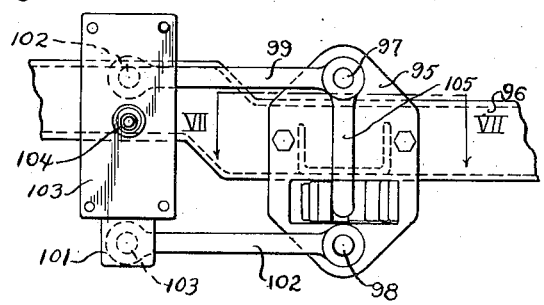
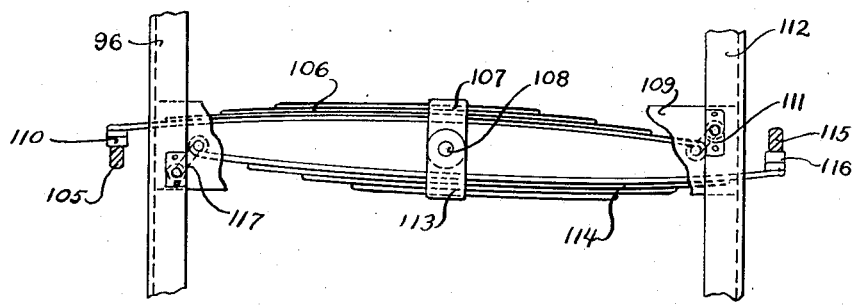
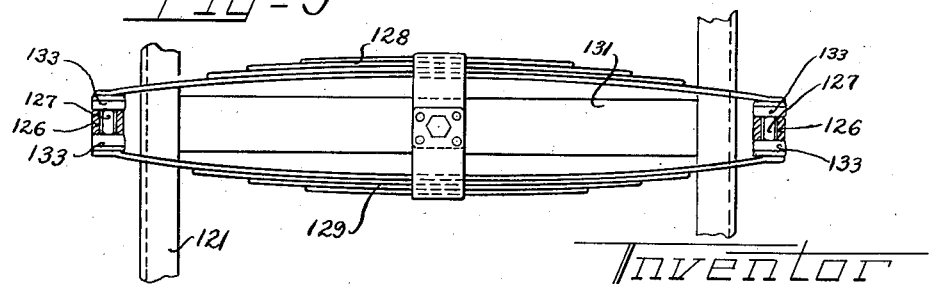
Inventor
ALFRED F. SCHIMEK
by Charles Allen Attys Feb. 25, 1941.  A. F. SCHIMEK  2,233,145
SPRING SUSPENSION
Filed Oct. 12, 1939   3 Sheets-Sheet 3
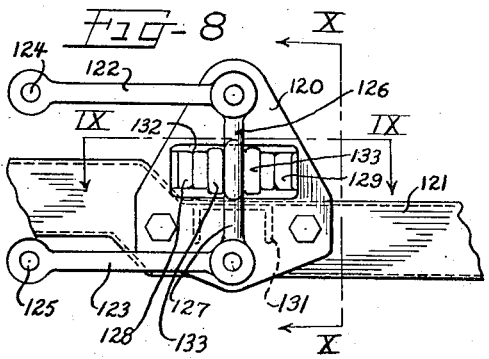
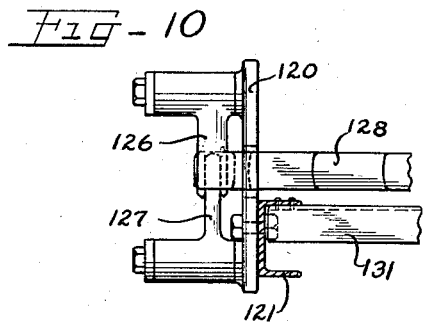
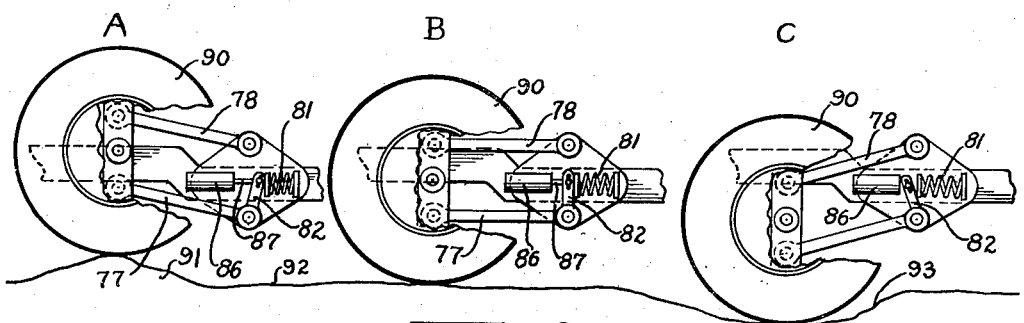
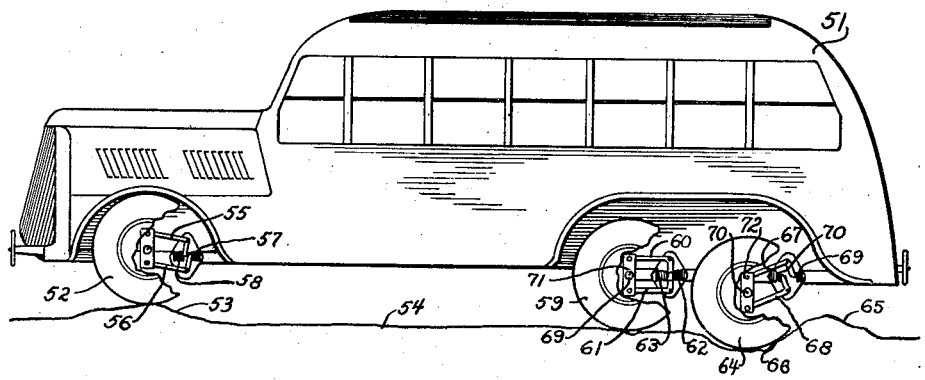
Inventor
ALFRED F. SCHIMEK
by Charles Niller Attys Patented Feb. 25, 1941

2,233,145

UNITED STATES PATENT OFFICE 2,233,145

SPRING SUSPENSION

Alfred F. Schimek, La Grange Park, Ill.

Application October 12, 1939, Serial No. 299,047

9 Claims. (Cl. 267—20)

This invention relates to spring suspension for vehicles, such as automobile spring suspension, and has as one of its principal objects the provision of a mechanism for connecting a road wheel to the frame or other unsprung portion of the vehicle in such a way as to minimize the effect of irregularities in the road surface upon the vehicle.

Another object of this invention is to provide a spring suspension for the front or steering wheels of a vehicle which is absolutely free from "wheel fight" or other similar disturbances and in which the wheels can rise and fall relative to the vehicle without the introduction of any gyroscopic forces.

Another object of this invention is to provide a spring suspension in which the relatively expensive steel used for springs is employed more economically than in previous suspensions and in which the same springs which serve to cushion a bump in the road also serve to control the rebound.

Another object of this invention is to provide a spring suspension unit which forms a complete subassembly adapted to be manufactured, if desired, in one department of a manufacturing establishment and applied as a unit to the frame of the vehicle on the assembly line.

Another object of this invention is to provide a spring suspension particularly for the front or dirigible wheels of a vehicle and which will maintain the caster angle of the dirigible wheels constant irrespective of the vertical movement of the wheels with respect to the rest of the vehicle.

One of the principal features of this invention comprises the supporting of the wheel by means of a linkage which guides the wheel in its upward or downward movement relative to the frame of the vehicle in a fixed plane without swinging the wheel to either side of that plane.

Another feature of the present invention is the use of a linkage for connecting the wheel support member and the frame of the vehicle which maintains the wheel support member parallel to its original position relative to the frame irrespective of its vertical movement.

The novel features which I believe to be characteristic of my invention are set forth and described with particularity in the appended claims. My invention itself, however, both as to its construction and organization, together with further objects and advantages thereof, may best be understood by reference to the following description taken in connection with the accompanying drawings, in which:

Figure 4 is a cross-section taken on the line IV—IV of Figure 1 and looking in the direction of the arrows, the wheel being omitted.

Figure 5 is a view similar to Figure 2, but on a smaller scale, showing a second form of the invention;

Figure 6 is a side view similar to Figure 5 and showing a third form of the invention;

Figure 7 is a section taken on the line VII—VII of Figure 6 and looking in the direction of the arrows;

Figure 8 is a side view similar to Figure 6 showing a fourth form of the invention;

Figure 9 is a section taken on the line IX—IX of Figure 8 and looking in the direction of the arrows;

Figure 10 is a section taken on the line X—X of Figure 8 and looking in the direction of the arrows;

Figure 11 is a view showing the action of the form of the invention shown in Figure 5 as it passes over inequalities in the road surface; and Figure 12 is a side elevation, with parts broken away, showing how one of the forms of the invention may be used for all of the wheels of a six wheeled vehicle.

Figure 1:
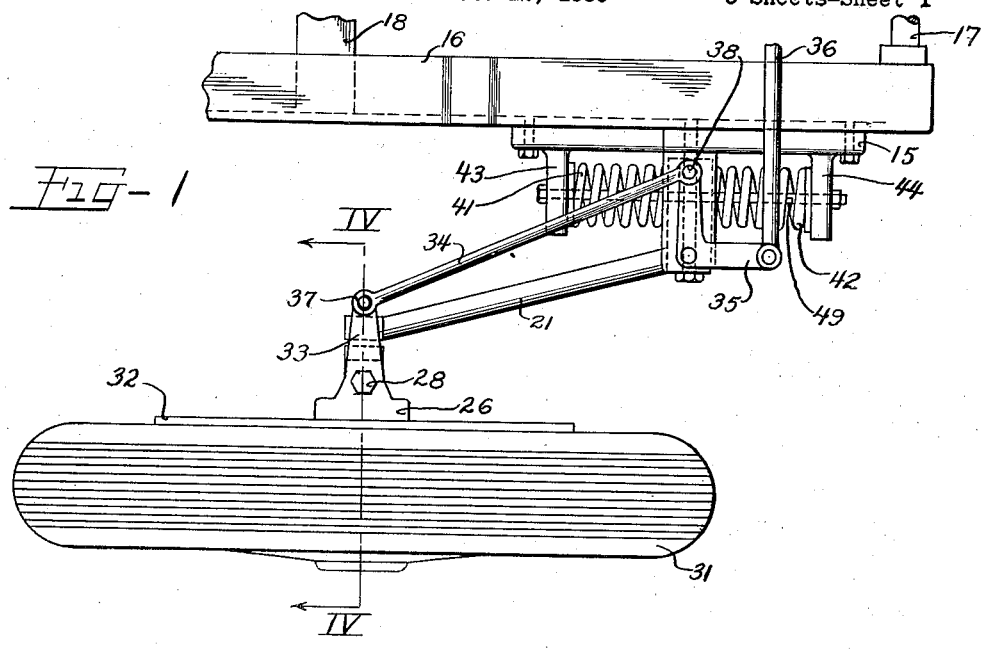
Figure 1 is a plan view of one of the preferred forms of the invention.

The form of the invention shown in Figures 1 to 4 is particularly adapted for use in connection with the steerable or dirigible wheels commonly employed at the front of motor vehicles. The construction at only one side of the vehicle is illustrated, for the two sides are symmetrical and the description for one will serve for both.

The suspension comprises a mounting plate 15 which is bolted or otherwise firmly secured to the side rail 16 of the frame of the vehicle. The side rail 16 is connected to the side rail on the other side of the vehicle by conventional cross members 17 and 18, or any other conventional form of frame may be employed. The invention may also be employed in connection with a vehicle having no conventional frame but in which the body is suitably strengthened to perform the functions of a frame. In such a case, the mounting plate 15 is secured directly to the body of the vehicle.

The mounting plate 15 carries a pair of vertically spaced pivots 19 and 20 whose axes extend substantially perpendicularly to the vertical longitudinal median plane of the vehicle, that is, across the vehicle. Each of the two pivots 19 and 20 carries a wheel support lever 21 or 22 which extends obliquely back and outwardly in a horizontal plane. The rearward ends of the wheel support levers 21 and 22 are connected to an upright wheel support member 23 by pivots 24 and 25 whose axes are parallel to the axes of the pivots 19 and 20 which secure the wheel support levers to the mounting plate 15.

The length of the upper wheel support lever 21 between the two pivots 19 and 24 is the same as the length of the lower wheel support lever 22 between the two pivots 20 and 25, and the distance between the two pivots 24 and 25 on the wheel support member 23 is the same as the distance between the two pivots 19 and 20 on the mounting plate 15. Hence the linkage formed by the mounting plate 15, the wheel support levers 21 and 22, and the wheel support member 23 is an equilateral four-bar linkage, and the wheel support member 23 will always be parallel to its original position with respect to the mounting plate 15.

The wheel support member 23 carries a steering knuckle 26 which is arranged to swing with respect to the wheel support member 23 about a substantially vertical axis. The wheel support member 23 and steering knickle 26, together with the parts carried by the steering knuckle 26, may be of any conventional design, as my invention is not limited to the particular construction shown. In the construction shown, the pivotal connection between the wheel support member 23 and the steering knuckle 26 is formed by a pair of aligned pivot members 27 and 28 fixed to the steering knuckle 26 and journaled in outwardly projecting portions of the wheel support member 23.

The steering knuckle 26 is formed integrally with the wheel spindle or stub axle 29 which is adapted to receive the wheel 31 (shown in Figure 1) and the wheel bearings in the conventional manner. A brake backing plate 32 is fixed to the steering knuckle 26 around the base of the wheel spindle 29 and serves to carry the nonrotating portion of the braking mechanism, this mechanism being conventional and therefore not illustrated.

In order to allow the wheel to be directed as desired for steering the vehicle, the steering knuckle 26 is provided with a steering arm 33 fixed to it or integral with it. The inner end of the steering arm 33 is connected by the steering link 34 to a steering lever 35 carried by the mounting plate 15 on the frame. The steering lever 35 is connected to the steering gear and to a similar steering lever on the other side of the vehicle by a tie rod 36 pivoted to it.

The ends of the steering links 34 are connected to the steering arm 33 and to the steering lever 35 by ball and socket joints 37 and 38 of the type conventionally used in steering linkages. When the wheel 31 is in its straight-ahead position, that is, parallel to the vertical longitudinal median plane of the vehicle, the two joints 37 and 38 are directly above the axes of the pivots at the ends of the wheel support levers 21 and 22. The joints 37 and 38 are also located so that the link 34 lies in a horizontal plane when the main portions of the levers 21 and 22 are horizontal. This geometric relation between the steering linkage and the remainder of the suspension allows the wheel support member 23, the steering knuckle 26 and the wheel 31 to rise and fall relative to the mounting plate 15 and the frame 16 without any incidental swinging of the steering knuckle 26 and wheel 31 to either side. While the exact geometric arrangement described above and shown in the drawings is preferable, it is not necessary that the ball and socket joints 37 and 38 at the ends of the link 34 be directly above the pivots of the wheel support levers 21 and 22. All that is necessary is that if one joint 37 is ahead or behind the axes of the pivots 24 and 25 below it, the other joint 38 should be ahead or behind the axes of the pivots 19 and 20 below it by the same amount, and that the link 34 lie in a transverse plane parallel to the transverse planes containing the main portions of the links 21 and 22. In other words, it is necessary that the link 34 as seen directly from the side, as in Figure 2, appear to be parallel to and have the same length as the main portions of the wheel support levers 21 and 22.

Figure 3:
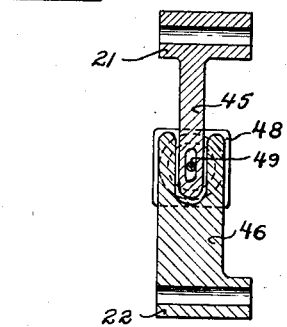
Figure 3 is a cross-section taken on the line III—III of Figure 2 and looking in the direction of the arrows.

The weight which is carried by the suspension is transmitted from the frame to the wheel support levers 21 and 22 by a pair of coil springs 41 and 42. The two springs 41 and 42 are located horizontally and end to end between a pair of spring seats 43 and 44 on the mounting plate 15 and act upon a pair of arms 45 and 46 located between them and forming parts of the wheel support levers 21 and 22. The arm 45 which forms part of the upper wheel support lever 21 extends vertically down from the pivot 19 while the other arm 46 which forms part of the other wheel support lever 22 extends upwardly from the pivot 20. The upper end of the lower arm 46 is forked, as shown in Figure 3, and extends up at each side of the lower end of the upper arm 45. This construction enables the ends of each of the two arms 45 and 46 to lie between the springs 41 and 42 and to be arranged symmetrically with respect to the line of action of the springs.

Each end of each of the two springs 41 and 42 is provided with a cushion or pad 47 or 48. These pads may be of any suitable form, but it is preferable to make them cup shaped so as to retain the ends of the springs 41 and 42 against lateral or vertical displacement, and they may be made of steel for strength covered with rubber to prevent noise. The spring pads 47 and 48 are in turn retained against lateral or vertical displacement by means of a guide rod 49 extending horizontally between the two spring seats 43 and 44, the center of the guide rod 49 passing through a suitable aperture in the end of the depending arm 45 of the upper wheel support lever 21, as shown in Figure 3.

Figure 2:
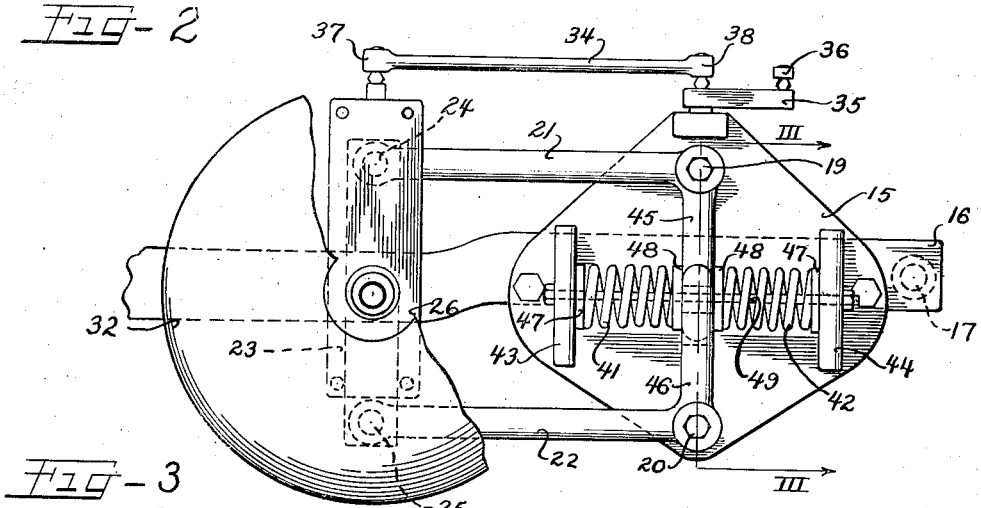
Figure 2 is a side view, with parts broken away, of the form of the invention shown in Figure 1.

It may be noted from Figure 2 that both of the inner spring pads 48 bear against the arms 45 and 46 of both the upper and lower wheel support levers 21 and 22. Hence both springs 41 and 42 act to transmit the weight carried by the wheel 31 and will also serve to resiliently check any downward movement of the wheel relative to the frame such as occurs during the rebound.

The ends of the two arms 45 and 46 lying between the spring pads 48 may, if desired, be made cam-shaped so as to give any desired spring-rate characteristics. For example, cam surfaces of relatively great convexity will provide a practically constant effective spring rate while cam surfaces only slightly convex and of considerable vertical extent will provide an effective spring rate that increases as the wheel moves from its median position.

While the spring seats 43 and 44 have been shown as being fixed, they may be made adjustable, thus making it feasible to readily change the initial tension in the springs, as may be desired for vehicles to be used for different purposes or for vehicles having different types of bodies of different weights. The same result may be attained by providing other spring pads of different thicknesses to replace the spring pads 47 or by replacing the springs themselves.

This suspension readily lends itself to the provision of mechanism for limiting or reducing sidesway. The upper wheel support levers 21 on the two sides of the vehicle may be fixed to stub shafts journaled in the mounting plates 15 instead of being mounted on fixed pivots 19, and the two stub shafts may be joined by a torsionally flexible shaft or be coupled to each other through a lost motion connection which allows a limited amount of independent rotation of the two stub shafts.

The operation of the suspension is well illustrated in Figure 12, which shows a six wheeled omnibus 51 having each of the six wheels connected to the frame of the vehicle by a spring suspension similar to the spring suspension shown in Figures 1 to 4. The suspensions on the omnibus 51 differ from the one shown in Figures 1 to 4 chiefly in that the wheel support levers 55, 56, 60, 61, 67 and 68 extend forwardly from their fulcrums on the frame instead of rearwardly.

In Figure 12, the front wheel 52 of the omnibus 51 is passing over a bump or protuberance 53 in the roadway 54. It may be seen that the wheel support levers 55 and 56 have swung above their normal positions and the two springs 57 and 58 have been compressed and are tending to return the wheel support levers 55 and 56 to their normal horizontal positions. The first rear wheel 59 is on a level portion of the road and the two wheel support levers 60 and 61 and the two springs are in their normal positions similar to those illustrated in Figure 2. The second rear wheel 64 has just passed over a bump or protuberance 65 and has rebounded into a depression 66 in the road. It will be seen that in this position, the wheel support levers 67 and 68 have swung below their normal horizontal positions and the springs 69 and 70 are again compressed and are acting to check the rebound.

While Figure 12 illustrates three different wheels 51, 59 and 64 in three different positions, it will of course be apparent that any one wheel will occupy the three successive positions illustrated at different times and that the same springs employed in connection with one wheel will serve to check both upward movement of that wheel on striking a bump 53 and the rebound of the wheel into a depression as at 66.

In the six-wheeled vehicle shown in Figure 12, the suspensions provided for the rear wheels 59 and 64 are generally similar to the suspension provided for the front wheel 52 and closely similar to the suspensions illustrated in Figures 1 to 4. However, no steering means are provided for the rear wheels 59 and 64, these wheels being journalled directly upon stub axles 69 and 70 carried directly by the upright wheel support members 71 and 72. The transmission of power to the rear wheels 59 and 64 may be provided for by a De Dion drive similar to that employed at the present time upon several designs of omnibusses.

In brief, this drive comprises a differential mounted upon the frame directly between the two wheels on opposite sides of the vehicle to be driven, and the differential is connected to full floating stub axle shafts by means of universally jointed propeller shafts extending transversely to the longitudinal median plane of the vehicle.

Another minor difference between the suspension units employed for the rear wheels 59 and 64 and the suspension unit employed for the front wheel 52 is that the wheel support arms 60, 61, 67 and 68 in the rear suspension units may lie in a plane parallel to the longitudinal median plane of the vehicle whereas the wheel support arms 55 and 56 in the front suspension unit extend obliquely so as to provide clearance for the swinging of the front wheel 52 during steering. This oblique positioning of the front wheel support levers 55 and 56 is similar to the oblique positioning of the wheel support lever 21 shown in Figure 1.

In the second principal form of the invention illustrated in Figure 5, an upright wheel support member 75 is connected to a mounting plate 76 by a wheel support lever 77 and a wheel support link 78, the wheel support lever 77 and the wheel support link 78 being similar to the two wheel support levers 21 and 22 in the form of the invention illustrated in Figures 1 to 4, and their pivotal connection also being similar. However, the wheel support link 78 is a simple link joining the two pivots 79 and 80 at its ends and it is not provided with a vertical arm for engagement with the spring 81.

The single wheel support lever 77 transmits the entire force of the spring 81, the lever 77 being provided with an upwardly extending portion or arm 82 carrying a spring pad 83 which receives one end of the spring 81. The other end of the spring 81 rests on a spring pad 84 supported by a spring seat 85 fixed to or made integral with the mounting plate 76.

Since the single spring 81 in this form of the invention is adapted to resist only upward movement of the wheel support member 75, as contrasted to the action of the two springs 41 and 42 in the form of the invention shown in Figures 1 to 4, other means are provided to control the rebound. This means comprises a dash pot or shock absorber 86 having a piston rod 87 connected to the arm 82 of the wheel support lever 77. The dash pot or shock absorber 86 may be single or double acting and may be of any conventional type.

The wheel support member 75 carries a steering knuckle 88 and wheel spindle 89 similar to those employed in the form of the invention illustrated in Figures 1 to 4. The wheel itself and the steering linkage are also similar to those shown in Figures 1 to 4 and therefore need no additional description or illustration.

The operation of this form of the invention is shown in Figure 11 which shows the suspension with the wheel 90 in three different positions. At A, the wheel 90 is lifted above its normal position by a bump 91 in the road 92. At B, the wheel 90 is in its median position, the road 92 being level at this point. At C, the wheel 90 is passing through a depression 93 and is below its normal position. It will be seen from the three positions of the suspension that the spring 81 is compressed and expands as the wheel 90 rises and falls and at the same time the piston or actuating rod 87 of the shock absorber 86 is moved in and out. It will thus be seen that in all of the positions of the wheel 90, the spring 81 bears against the arm 82 and always resiliently carries the weight of the car transmitted to the wheel 90 and that the shock absorber 86 serves at all times to dampen the movement of the wheel 90.

The third principal form of the invention, which is illustrated in Figures 6 and 7, comprises a mounting plate 95 rigidly secured to a frame side rail 96 and carrying a pair of vertically spaced transversely extending horizontal pivots 97 and 98. The upper pivot 97 carries a wheel support lever 99 which extends horizontally and forwardly and has the upper end of a wheel support member 101 secured to its end by a pivot 102. The lower end of the wheel support member 101 is guided by a link 102 secured to it by a pivot 103 and journaled on a pivot 98 on the mounting plate 95. The general arrangement of the mounting plate 95, the wheel support member 99, the wheel support member 101, the link 102 and their pivots is generally similar to that of the corresponding parts of the form of the suspension illustrated in Figures 1 to 4, and the wheel support member 101 carries a steering knuckle 103 and wheel spindle 104 in a similar manner.

In this form of the suspension, however, the weight of the vehicle is transmitted to the wheel by the single wheel support lever 99 which is provided with a vertically extending arm 105 upon which the spring 106 acts.

The spring 106 is a cantilever leaf spring extending transversely across the vehicle and placed so as to flex in a horizontal plane. The median portion of the spring is secured in a saddle member 107 mounted on a central vertical pivot 108 on the under side of a frame cross member 109. One end of the spring 106 projects out under the frame side rail 96 and carries a spring pad 110 which bears against the end of the arm 105 of the wheel support lever 99. The other end of the spring 106 is connected by a shackle 111 to the other frame side rail 112. It will be seen that this arrangement permits the entire length of the spring 106 to flex in response to the movement of the wheel support lever arm 105 and that it permits an unusually long and flexible spring to be employed, giving the utmost comfort to the movement of the vehicle in response to irregularities of the road surface.

The central pivot 108 on the frame member 109 also carries a second spring saddle 113 and a second spring 114 which form part of the suspension unit on the other side of the vehicle. As may be seen from Figure 7, the second spring 114 faces in the opposite direction as compared to the first spring 106 and is arranged to resist flexing towards the opposite end of the vehicle. The second spring suspension unit, therefore, differs slightly from the unit shown in Figure 6, this difference being merely the placing of the spring support lever on the lower pivots of the mounting plate and the wheel support member instead of on the upper pivots so that upward movement of the wheel support member will tend to move the wheel support lever arm 115, shown in Figure 7, back against the end of the spring 114. The spring 114 is provided with a spring pad 116 on the end which engages the wheel support lever arm 115 and with a spring shackle 117 connecting its other end to the frame side rail 96.

The fourth principal form of the invention, shown in Figures 8, 9 and 10, is generally similar to the forms which have been described above but combines some of the distinctive features of the first and third form. In this form of the invention, a mounting plate 120 is secured to the frame side rail 121 and carries upper and lower wheel support levers 122 and 123 similar to those employed in the first form of the invention. The forward ends of the wheel support levers 122 and 123 are provided with pivots 124 and 125 which carry a steering knuckle, brake backing plate, and a wheel similar to those described above, but these parts, for the sake of simplicity, have been omitted from the drawings.

The wheel support levers 122 and 123 are formed with vertical arms 126 and 127, the upper one of which is forked and extends down at each side of the lower one, the arms thus being similar to the arms shown in Figure 3 but being inverted. The ends of the arms 126 and 127 lie between the ends of a pair of transversely extending leaf springs 128 and 129 whose centers are rigidly secured to a frame cross member 131. The ends of the springs 128 and 129 pass over the frame side rail 121 and through an aperture 132 in the mounting plate 120, the aperture 132 being large enough to allow the necessary range of movement to the spring. The extreme ends of the springs 128 and 129 are provided with pads 133, formed of rubber or similar material, which insulate them against direct metal to metal contact with the arms 126 and 127 and serves to cushion the action of the springs and to prevent noise. As may be seen in Figure 9, the springs 128 and 129 extend completely across the frame of the vehicle so that while one end of each spring 128 and 129 engages the arms 126 and 127 of the suspension on one side of the vehicle, the other ends of the springs engage the similar arms of the suspension unit on the other side of the vehicle. Thus the two springs furnish the entire spring action for one end of the vehicle.

The action of the two springs 128 and 129 on the wheel support lever arms 126 and 127 is similar to the action of the two springs 41 and 42 upon the wheel support lever arms 45 and 46 in the form of the invention shown in Figures 1 to 4 and need not therefore be described in detail. The initial tension in the springs 128 and 129 may be adjusted by making the spring seats which fix them to the frame adjustable or by supplying springs with a greater or lesser number of spring leaves.

While I have shown only four particular forms of my suspension, it will of course be understood that the invention is not limited thereto and that many other forms and modifications are possible and that certain portions of the invention, such as the arrangements of the springs, are sub-inventions in their own right and may be used in other connections, as with other linkages. I therefore contemplate by the appended claims to cover all such modifications as fall within the true spirit and scope of my invention.

I claim as my invention:

1. In a vehicle, a frame, a pair of longitudinally extending arms pivotally connected to the frame for swinging about substantially horizontal transverse axes, a wheel support member pivotally carried by said arms for substantially vertical translational movement, said arms comprising portions of levers having other arms one of said other arms having a bifurcated portion straddling the other of said other arms whereby their ends are movable relative to each other in overlapping arcs, and spring means acting simultaneously on the straddling and straddled portions of both of said other arms for resiliently resisting said movement of said wheel support member in either direction from a median position.

2. In a vehicle, a frame, a pair of longitudinally extending arms pivotally connected to the frame for swinging about substantially horizontal transverse axes, a wheel support member pivotally carried by said arms for substantially vertical translational movement, said arms comprising portions of levers having other arms extending into overlapping relation, one of said other arms having a bifurcated end normally straddling the adjacent end of the other arm whereby said ends are movable relative to each other in overlapping arcs, and coil springs on both sides of said other arms, each of said coil springs normally bearing against the straddling and straddled portions of said other arms whereby said movement of said wheel support member in either direction from a normal position is resiliently resisted by said springs.

3. In a vehicle, a frame, a pair of longitudinally extending arms pivotally connected to the frame for swinging about substantially horizontal transverse axes, a wheel support member pivotally carried by said arms for substantially vertical translational movement, said arms comprising portions of levers having other arms extending into overlapping relation, one of said other arms having a bifurcated end normally straddling the adjacent end of the other arm whereby said ends are movable relative to each other in overlapping arcs, and leaf springs on both sides of said other arms, each of said leaf springs normally bearing against the straddling and straddled portions of said other arms whereby said movement of said wheel support member in either direction from a normal position is resiliently resisted by said springs.

4. In a vehicle, a frame, a wheel, a pair of normally aligned members movable in adjacent overlapping paths, one of said members being arranged to straddle the other member when in said aligned position, at least the median portions of said paths being substantially parallel, mechanism interconnecting said wheel and said members for guiding said wheel in a substantially vertical path relative to said frame and for moving said members in opposite directions upon movement of said wheel in one direction, and a pair of spring means in the line of movement of said members, one of said spring means being on either side of said members and each of said spring means being constructed and arranged to be acted upon by whichever of said members moves towards said spring means.

5. In a vehicle, a frame, a wheel, a pair of members swingable about parallel axes and having arms lying alongside of each other and arranged for relative movement in overlapping arcs, mechanism interconnecting said wheel and said members for guiding said wheel in a substantially vertical path relative to said frame and for swinging said members in the same rotative direction about said axes upon movement of said wheel in one direction, guide means adjacent to the ends of said arms and extending in a direction substantially perpendicular to the plane of said axes, a spring pad movable along said guide means and adapted to bear against one side of each of said arms, and a coil spring acting between said frame and said spring pad.

6. In a vehicle, a frame, a wheel on one side of said frame, a pair of members having their longitudinal axes in normal coincidence and portions thereof movable in adjacent overlapping paths, at least the median portions of said paths being substantially parallel to the longitudinal horizontal axis of said vehicle, mechanism interconnecting said wheel and said members for guiding said wheel in a substantially vertical path relative to said frame and for moving said portions of said members in opposite directions upon movement of said wheel in one direction, and a pair of transversely extending semi-elliptic springs having their centers fixed to said frame and being adapted to flex in a horizontal plane, and the ends of said springs bearing against the front and rear surfaces of said overlapping portions of said members.

7. In a vehicle, a spring suspension comprising a pair of members swingable about parallel axes, a wheel, means interconnecting said members and said wheel for swinging said members in the same rotative direction, an arm on each of said members and normally lying in the plane of said axes, the end of one of said arms being forked and lying in said plane at each side of the end of the other arm, guide means extending perpendicular to said plane, a member movable along said guide means and adapted to bear against the ends of said arms, and spring means operating between the vehicle frame and said member for resiliently resisting movement of said last mentioned member away from said arms.

8. In a vehicle, a spring suspension comprising a pair of members swingable about parallel axes, a wheel, means interconnecting said members and said wheel for swinging said members in the same rotative direction, an arm on each of said members and normally lying in the plane of said axes, the end of one of said arms being forked and lying in the same plane at each side of the end of the other arm, and a pair of springs each having an end movable in a direction substantially perpendicular to said plane, the ends of said springs bearing against opposite sides of the ends of said arms.

9. A spring suspension mechanism for a vehicle comprising a pair of bell-crank levers pivotally connected at their angles to said vehicle for swinging movement in a substantially vertical plane, said levers having spaced parallel normally horizontal arms and overlapping normally vertical arms, one of said vertical arms being shaped for straddling the end of the other vertical arm whereby said ends are relatively movable in overlapping arcs, a wheel support member pivoted to the free ends of said horizontal arms, and a pair of resilient damping elements engaging the straddling and straddled ends of said vertical arms for resisting vertical movement of said wheel support member.

ALFRED F. SCHIMEK.